May 11, 1948.  G. E. DATH  2,441,187

FRICTION SHOCK ABSORBING MECHANISM FOR RAILWAY CAR BUFFERS

Filed July 10, 1944

Inventor
George E. Dath
By Henry Fuchs
Atty.

Patented May 11, 1948

2,441,187

UNITED STATES PATENT OFFICE 2,441,187

FRICTION SHOCK ABSORBING MECHANISM FOR RAILWAY CAR BUFFERS

George E. Dath, Mokena, Ill., assignor to W. H. Miner, Inc., Chicago, Ill., a corporation of Delaware Application July 10, 1944, Serial No. 544,193

11 Claims. (Cl. 213—24)

This invention relates to improvements in friction shock absorbing mechanisms for railway car buffers, especially adapted for use in connection with railway draft riggings.

One object of the invention is to provide a friction shock absorbing mechanism having preliminary spring action to absorb the lighter shocks to which the mechanism is subjected, followed by high combined frictional and spring resistance to absorb the heavier shocks, wherein the mechanism which produces these results comprises a spring cage containing the main spring resistance, a movable friction shell anchored to the spring cage, and a friction clutch slidable within the friction shell, the friction shell and friction clutch being movable in unison inwardly of the spring cage to compress the main spring resistance to provide the preliminary spring action of the mechanism, and inward movement of the shell being limited after a predetermined compression of the mechanism, thereby compelling relative movement of the friction clutch and shell during the remainder of the compression stroke of the mechanism, resisted by the main spring to provide the high combined frictional and spring resistance to absorb the heavier shocks.

A more specific object of the invention is to provide in a mechanism as set forth in the preceding paragraph, simple and efficient means for securely locking the friction shell to the spring cage which effectively prevents accidental disengagement of the shell from the cage.

Other objects of the invention will more clearly appear from the description and claims hereinafter following.

Figure 1:
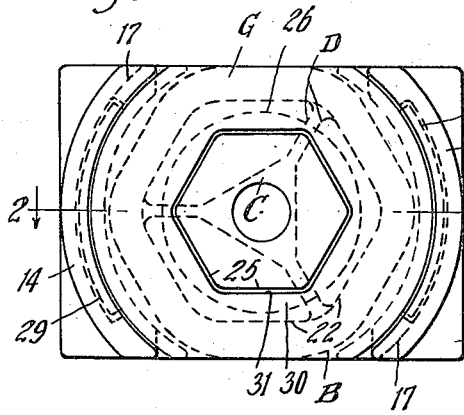
Figure 3:
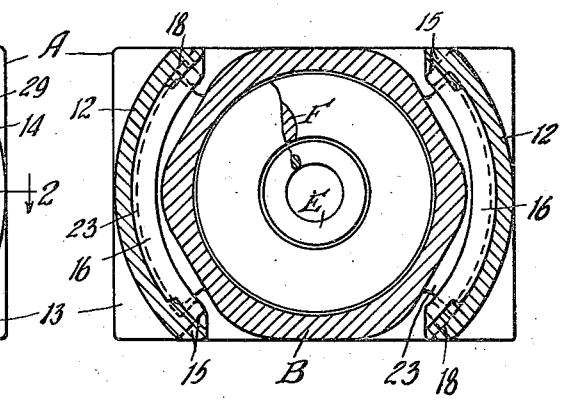
Figure 2:
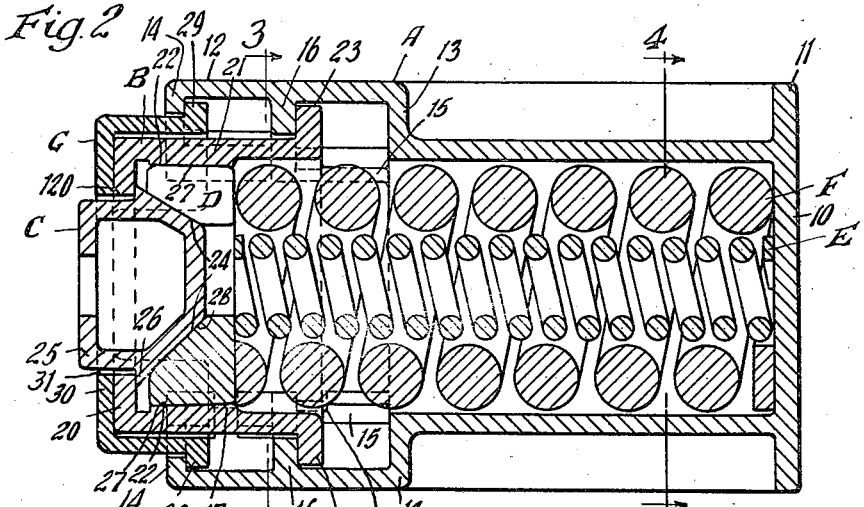
Figure 4:
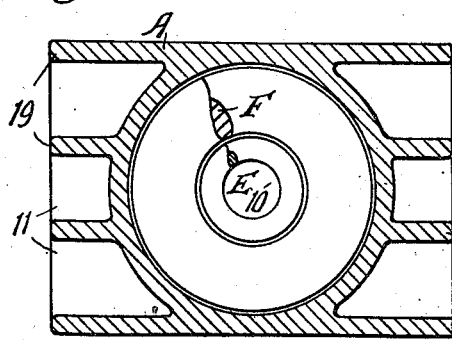
Figure 5:
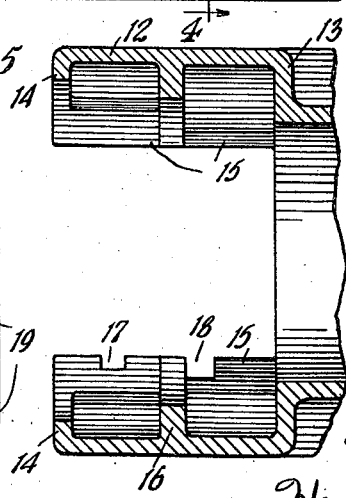

In the drawing forming a part of this specification, Figure 1 is a front elevational view of my improved shock absorbing mechanism. Figure 2 is a horizontal, longitudinal sectional view, corresponding substantially to the line 2—2 of Figure 1. Figures 3 and 4 are transverse, vertical sectional views, corresponding respectively to the lines 3—3 and 4—4 of Figure 2. Figure 5 is a horizontal, longitudinal sectional view of the front end portion of the spring cage only of the mechanism shown in Figure 2, said view corresponding to Figure 2 with the exception that all other parts are omitted.

My improved shock absorbing mechanism, as illustrated in the drawing, comprises broadly a spring cage A; a friction shell B; a wedge block C; three friction shoes D—D—D; an inner spring E; an outer spring F; and a locking sleeve G.

The spring cage A is in the form of a cylindrical shell closed by a transverse rear end wall 10, which is extended laterally outwardly of the cage to provide flanges 11—11, which together with the wall 10 form a rear follower member integral with the spring cage. The cage A is open at the front end and is provided with laterally spaced side walls or wings 12—12 at said open front end, forming a laterally enlarged portion of the cage. The walls 12—12 are curved, as clearly shown in Figures 1 and 3, and are concentric with the cylindrical wall of the cage. At the rear ends thereof, the walls 12—12 are joined to the cylindrical spring cage proper by short transverse walls 13—13, which form rear stop shoulders of the spring cage. At the front end, each wall 12 is provided with an inturned arcuate flange 14, which forms a front stop shoulder at the corresponding side of the spring cage. At the top and bottom ends thereof, each wall 12 is provided with longitudinally extending ribs or flanges 15—15, which project inwardly and are radial to the central longitudinal axis of the mechanism. These top and bottom stop flanges 15—15 define a guideway therebetween, for a purpose hereinafter pointed out. Between the flange 14 and the wall 13, a vertically disposed stop rib 16 of arcuate shape is provided on each wall 12. The rib 16 forms a stop shoulder which is intermediate the stop shoulders provided by the inturned flange 14 and the transverse wall 13. The bottom flange 15 of one of the side walls 12 is notched midway between the rib 16 and the inturned flange 14, as indicated at 17. A second notch 18 is provided in this flange 15 immediately to the rear of the rib 16. As clearly shown in Figure 5, the notch 18 is of greater width and depth than the notch 17. The upper flange 15 of the opposed wall 12 is notched in a similar manner having a notch 17 between the stop rib 16 and the flange 14 and a notch 18 immediately to the rear of the rib 16. The spring cage A is reenforced by a plurality of longitudinally extending, parallel ribs 19—19, which are formed integral with the cylindrical wall of the cage and extend from the transverse walls 13—13 to the flanges 11—11 at the rear end of the cage.

The friction shell B is in the form of a tubular member of hexagonal exterior cross section, having an inturned continuous flange 20 at the front end thereof, providing an opening 120 at said front end of the casing, which is of hexagonal outline. The walls of the shell B are thickened adjacent the front end thereof immediately to the rear of the flange 20, as indicated at 21. At said thickened wall portions, the shell B is of hexagonal interior cross section, presenting six flat, longitudinally extending friction surfaces 22—22, which are arranged symmetrically about the central longitudinal axis of the shell and converge inwardly of said shell. The shell thus presents a tapered friction shell portion with which the friction shoes cooperate. Rearwardly of the friction surfaces 22—22, the interior of the shell is preferably of cylindrical interior cross section, as clearly shown in Figures 2 and 3. At the rear end thereof, the shell B is provided with a pair of laterally outwardly projecting, arcuate, retaining flanges or wings 23—23. The flanges or wings 23—23 are at diametrically opposite sides of the shell and are made of such a thickness that they will pass freely through the notches 18—18 of the flanges 15—15 of the walls 12—12 of the spring cage A in edgewise direction.

The wedge C is in the form of a hollow block and engages the main follower of the draft rigging. At the inner end, the block C has three, inwardly converging, flat wedge faces 24, which cooperate with the friction shoes. At the front end, the wedge block C is reduced in size, as indicated at 25, said reduced portion 25 being of hexagonal transverse cross section. A transverse shoulder 26, which extends around the block, is provided at the inner end of the reduced portion 25. The shoulder 26 is adapted to engage with the inturned flange 20 of the shell B to limit outward movement of the wedge block.

The friction shoes D, which are three in number, are arranged symmetrically about the central longitudinal axis of the mechanism and each shoe has a longitudinally extending, V-shaped friction surface 27 on the outer side thereof, which engages two adjacent friction surfaces 22—22 of the shell B. On the inner side, each shoe D is provided with a flat wedge face 28, which engages the corresponding wedge face 24 of the wedge block C and is correspondingly inclined to said face.

The spring resistance, which is contained in the spring cage, comprises inner and outer coil springs E and F, which bear at their front and rear ends, respectively, on the inner ends of the shoes D—D—D and the transverse end wall 10 of the spring cage. The springs E and F are preferably under initial compression in the assembled condition of the mechanism.

The locking sleeve G is in the form of a cylindrical collar having laterally outwardly projecting, diametrically opposite flanges or wings 29—29 at the rear ends. The flanges or wings 29—29 are of arcuate shape and of a thickness so they will freely pass edgewise through the notches 17—17 of the flanges 15—15 of the walls 12—12 of the spring cage. At the front end, the sleeve G is provided with an inturned, continuous flange 30, defining an opening 31 of hexagonal outline at the front end of the sleeve. The opening 31 corresponds in size to the hexagonal opening 120 of the friction shell and registers with said opening. The hexagonal projection 25 of the wedge C extends through and fits the openings 31 and 120 at the front ends of the sleeve G and the friction shell B. Inasmuch as the projection 25 fits the openings of the sleeve G and the shell B, the latter are effectively locked against rotation with respect to the wedge C.

In the assembled condition of the mechanism, the flanges 23—23 of the shell B are interposed between the intermediate stop shoulders 16—16 and the rear stop shoulders 13—13 of the spring cage, these flanges being of such a height that they are guided for lengthwise movement between the top and bottom flanges 15—15 of the walls 12—12 of the spring cage. The flanges 29—29 of the locking sleeve G are interposed between the front stop shoulders 14—14 and the intermediate stop shoulders 16—16 of the spring cage and are of such a height that they are guided for lengthwise movement between the flanges 15—15 of the cage. As will be evident, outward and inward movement of the shell is limited by the flanges 23—23 thereof engaging, respectively, the ribs 16 and the walls 13. Outward movement of the sleeve G is limited by engagement of the flanges 29—29 thereof with the flanges 14—14 of the cage.

In assembling the mechanism, the springs E and F are first placed within the spring cage. The friction shell B, with the wedge C and friction shoes D—D—D assembled therewith, is next applied. In applying the friction shell to the spring cage, the shell is rotated to a position where the flanges 23—23 thereof are disposed vertically and pass between the walls 12—12 of the spring cage. While in this position, the friction shell is forced inwardly against the springs E and F until the flanges 23—23 register with the openings 18—18 of the flanges 15—15 of the side walls 12—12. The friction shell is then rotated to a position to engage the flanges 23—23 thereof in back of the stop shoulders 16—16, the flanges 23—23 passing freely through the openings 18—18, as hereinbefore pointed out. The locking sleeve G is next applied, the wedge C being first forced inwardly to an extent to completely clear the flange 30 of the sleeve G when the flanges 29—29 of the latter are aligned with the openings or notches 17—17 of the spring cage, the sleeve G being then engaged with the flanges 14—14 of the spring cage by first rotating said sleeve to position the flanges 29—29 thereof vertically so that they will pass between the side walls 12—12 of the cage and then forcing the sleeve inwardly to bring the flanges 29—29 in alignment with the openings or notches 17—17 of the cage, and rotating the sleeve to position the flanges thereof in alignment with and to the rear of the flanges 14—14 of the cage. The pressure is then removed from the wedge block C, permitting the same to be projected forwardly by the springs E and F and bringing the hexagonal locking projection 25 in interlocking engagement with the hexagonal openings of the friction shell and spring cage. As will be evident, the flanges 23—23 of the friction shell and the flanges 29—29 of the locking sleeve being engaged between the guide flanges 15—15 and 15—15 of the spring cage hold the sleeve and shell against rotation with respect to the spring cage. It should be further noted that the shoes D—D—D and the wedge block C are locked against rotation with respect to the friction shell B by the interlocking formation of the V-shaped friction surfaces of the shoes and shell and the flat wedge faces of the wedge and shoes. The hexagonal projection on the wedge locks the friction shell B and locking sleeve G against relative rotation with respect to the wedge block, thereby preventing accidental disengagement of the friction shell from the spring cage when the flanges 23—23 of the shell are moved into a position of alignment with the notches or openings 18—18 of the spring cage. This is due to the fact that the locking sleeve moves in unison with the friction shell and is effectively locked against rotation by the flanges 29—29 thereof being engaged between the guide ribs 15—15 and 15—15 of the spring cage, the flanges 29—29 being disposed forwardly of the notches or openings 17—17 of the spring cage at this time. Accidental disengagement of the locking sleeve G is prevented in a similar manner by the flanges 23—23 of the friction shell being locked between the guide flanges 15—15 and 15—15 of the spring cage, the flanges 23—23 being disposed rearwardly of the notches 18—18 when the flanges 29—29 of the sleeve G are in alignment with the notches or openings 17—17.

The operation of my improved shock absorbing mechanism is as follows: During compression of the mechanism, the wedge block C is forced inwardly by the front follower of the railway draft rigging, thereby setting up a wedging action between the block and the friction shoes and forcing the latter tightly against the friction surfaces of the friction shell B. Due to the frictional resistance thus produced between the shoes and the friction shell, the shell moves inwardly with the wedge during initial compression of the mechanism, thereby compressing the springs E and F and producing relatively light spring action. This action continues until inward movement of the friction shell is arrested by engagement of the flanges 23—23 thereof with the rear stop shoulders 13—13 of the spring cage. Upon movement of the shell being thus limited, the friction shoes are compelled to move inwardly with respect to the shell, thereby providing high combined frictional and spring resistance during the remainder of the compression stroke. When the actuating pressure is reduced, the springs E and F force the friction shell and friction shoes outwardly until movement of the shell is arrested by engagement of the flanges 23—23 thereof with the intermediate stop shoulders 16—16 of the spring cage, whereupon the actuating force of the springs carries the shoes and wedge outwardly of the friction shell until movement of the wedge is limited by shouldered engagement thereof with the flange 20 of the friction shell.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a spring cage; of a friction shell having limited relative lengthwise movement with respect to the spring cage; a friction clutch slidably telescoped within the shell for lengthwise movement with respect to the shell, said clutch including a wedge member; interengaging anchoring means on said cage and shell; a locking sleeve; interengaging anchoring means on said sleeve and cage for limiting outward movement of the sleeve with respect to the cage; interengaging means on said wedge, locking sleeve and shell for locking the sleeve and shell against rotation with respect to said wedge; and spring means within the cage yieldingly opposing inward movement of said clutch.

2. In a friction shock absorbing mechanism, the combination with a spring cage having inner, outer, and intermediate stop shoulders; of a friction shell slidable with respect to the cage, said shell having stop flanges engaged between said inner and intermediate stop flanges; a friction clutch slidable within said friction shell, said clutch including a pressure transmitting wedge member; a locking sleeve engaged over the shell, said sleeve having stop flanges engaged between said outer and intermediate stop shoulders; interengaging means on said sleeve and wedge, and shell and wedge, for locking the same against relative rotation; and spring means within the cage yieldingly opposing inward movement of the clutch and friction shell.

3. In a friction shock absorbing mechanism, the combination with a spring cage having front, rear, and intermediate stop flanges, and longitudinally extending, top and bottom guide flanges extending from said front to said rear stop flanges; of a friction shell slidable with respect to the cage and having stop flanges interposed between said rear and intermediate stop flanges and guided between said top and bottom guide flanges; a friction clutch slidable within said friction shell, said clutch including a pressure transmitting wedge member; a locking sleeve engaged over the shell, said sleeve having stop flanges interposed between said front and intermediate stop flanges and guided for movement between said spaced guide flanges; interengaging means on said sleeve and wedge, and shell and wedge, for locking the same against relative rotation; and spring means within the cage yieldingly opposing inward movement of the clutch and friction shell.

4. In a friction shock absorbing mechanism, the combination with a spring cage having inner, outer, and intermediate stop shoulders; of a friction shell slidable with respect to the cage, said shell having stop flanges interposed between said inner and intermediate stop flanges and adapted to be brought into alignment with the same by rotation of said shell with respect to the cage; a friction clutch slidable within said friction shell, said clutch including a pressure transmitting wedge member; a locking sleeve engaged over the shell, said sleeve having stop flanges engaged between said outer and intermediate stop shoulders by rotation of said sleeve with respect to the cage; interengaging means on said sleeve and wedge, and shell and wedge, for locking the same against relative rotation; and spring means within the cage yieldingly opposing inward movement of the clutch and friction shell.

5. In a friction shock absorbing mechanism, the combination with a spring cage having inner, outer, and intermediate stop shoulders, and longitudinally extending, top and bottom guide flanges extending from said outer to said inner stop shoulders, said guide flanges having openings therethrough between said front and intermediate stop shoulders, and additional openings therethrough between said intermediate and rear stop shoulders; of a friction shell slidable with respect to the cage and having stop flanges adapted to pass through said first named openings and interposed between said inner and intermediate stop flanges by rotation of said shell with respect to the cage and guided between said top and bottom guide flanges; a friction clutch slidable within said friction shell, said clutch including a pressure transmitting wedge member; a locking sleeve engaged over the shell, said sleeve having stop flanges adapted to pass through said second named openings and interposed between said outer and intermediate stop shoulders by rotation of said sleeve with respect to the cage and guided for movement between said top and bottom guide flanges; interengaging means on said sleeve and wedge, and shell and wedge, for locking the same against relative rotation; and spring means within the cage yieldingly opposing inward movement of the clutch and friction shell.

6. In a friction shock absorbing mechanism, the combination with a spring cage having inner, outer, and intermediate stop shoulders, and longitudinally extending, top and bottom guide flanges extending from said outer to said inner stop shoulders, said guide flanges having openings therethrough immediately in back of said intermediate stop shoulders, and additional openings therethrough midway between said front and intermediate stop shoulders; of a friction shell slidable with respect to the cage and having stop flanges adapted to pass through said first named openings and interposed between said inner and intermediate stop flanges by rotation of said shell with respect to the cage and guided between said top and bottom guide flanges; a friction clutch slidable within said friction shell, said clutch including a pressure transmitting wedge member; a locking sleeve engaged over the shell, said sleeve having stop flanges adapted to pass through said second named openings and interposed between said outer and intermediate stop shoulders by rotation of said sleeve with respect to the cage and guided for movement between said top and bottom guide flanges; interengaging means on said sleeve and wedge, and shell and wedge, for locking the same against relative rotation; and spring means within the cage yieldingly opposing inward movement of the clutch and friction shell.

7. In a friction shock absorbing mechanism, the combination with a spring cage open at its front end; of a friction shell slidable within said open end of the cage and having limited lengthwise movement with respect to the same; friction shoes slidable within the friction shell and interlocked with the shell against relative rotation; a wedge block having wedging engagement with the shoes and interlocked with the shoes against relative rotation; interengaging anchoring means on said shell and cage for limiting outward movement of the shell with respect to the cage; means on said cage engaging the anchoring means of the shell to hold the shell and cage against relative rotation; a locking sleeve engaged over said shell; interengaging anchoring means on said sleeve and cage for limiting outward movement of the sleeve with respect to the cage; means on said cage engaging said anchoring means of the sleeve to hold the sleeve and cage against relative rotation; a locking projection on said wedge engaged with said sleeve and shell holding said sleeve and shell against rotation with respect to said wedge; and spring means within the cage yieldingly opposing inward movement of the shoes and shell.

8. In a friction shock absorbing mechanism, the combination with a spring cage open at its front end and having inner, outer, and intermediate stop shoulders at said open end; of a friction shell slidable within said open end of the cage having stop flanges engaged between said inner and intermediate stop flanges by rotation of said shell with respect to the cage; friction shoes slidable within the shell and interlocked with the shell against relative rotation; a wedge block having wedging engagement with the shoes and interlocked with said shoes against relative rotation; a locking sleeve engaged over the shell, said sleeve having stop flanges engaged between said outer and intermediate stop shoulders by rotation of said sleeve with respect to the cage; a locking projection on said wedge engaged with the sleeve and shell, holding said sleeve and shell against rotation with respect to the wedge; and spring means within the cage opposing inward movement of the shoes and shell.

9. In a friction shock absorbing mechanism, the combination with a spring cage open at its front end; of a friction shell slidable within said open end of the cage and having limited lengthwise movement with respect to the same, said shell having an inturned stop flange at its outer end providing an opening of angular cross section at the front end of the shell; friction shoes slidable within the friction shell and interlocked with the shell against relative rotation; a wedge block having wedging engagement with the shoes and interlocked with the shoes against relative rotation, said block having shouldered engagement with the stop flange of the shell to limit outward movement of said block; interengaging anchoring means on said shell and cage for limiting outward movement of the shell with respect to the cage; means on said cage engaging said anchoring means of the shell to hold the shell and cage against relative rotation; a locking sleeve engaged over said shell; interengaging anchoring means on said sleeve and cage for limiting outward movement of the sleeve with respect to the cage; means on said cage engaging said anchoring means of the sleeve to hold the sleeve and cage against relative rotation; an inturned flange at the outer end of said sleeve engaged over the stop flange of the shell and providing an opening of angular cross section at the front end of the sleeve registering with the opening at the front end of the shell; a locking projection of angular cross section on said wedge, extending through and fitting the angular openings of said shell and sleeve to hold said sleeve and shell against rotation with respect to said wedge; and spring means within the cage yieldingly opposing inward movement of the shoes and shell.

10. In a friction shock absorbing mechanism, the combination with a spring cage open at its front end and having inner, outer, and intermediate stop shoulders at said open end; of a friction shell slidable within said open end of the cage having stop flanges engageable with said inner and intermediate stop shoulders, said stop flanges being positioned between said stop shoulders by rotation of said shell with respect to the cage, said shell having an inturned stop flange at its outer end providing an opening of angular cross section at the front end of the shell; friction shoes slidable within the shell and interlocked with the shell against relative rotation; a wedge block having wedging engagement with the shoes and interlocked with said shoes against relative rotation; a locking sleeve engaged over the shell, said sleeve having stop flanges interposed between said outer and intermediate stop shoulders, said sleeve being rotatable with respect to the cage to bring the flanges thereof into alinement with said outer and intermediate shoulders; an inturned flange at the outer end of said sleeve engaged over the stop flange of the shell and providing an opening of angular cross section at the front end of the sleeve registering with the opening at the front end of the shell; a locking projection of angular cross section on said wedge extending through and fitting the angular openings of said shell and sleeve to hold said sleeve and shell against rotation with respect to the wedge; and spring means within the cage opposing inward movement of the shoes and shell.

11. In a friction shock absorbing mechanism, the combination with a spring cage; of a friction shell having guide wings; a locking member for said friction shell, said member having guide wings, said member and friction shell being normally in abutment with each other and movable inwardly and outwardly in unison; a friction clutch slidable within the shell; spring means within the cage opposing inward movement of said clutch and shell; a lengthwise extending guideway in which said wings of said member and shell are guided, restricting said wings to movement lengthwise of the cage, said guideway having entrance openings through which said wings of said member and shell may be entered edgewise by rotation of the same in assembling the mechanism, said entrance openings being spaced longitudinally of the mechanism and said wings of said abutting member and shell being spaced a predetermined distance apart in a direction lengthwise of the mechanism, said spacing of said wings being different from the spacing between said entrance openings, whereby simultaneous registration of said wings of said member and shell with said openings is prevented during operation of the mechanism; and means for locking said member and shell against relative rotation.

GEORGE E. DATH.

REFERENCES CITED

The following references are of record in the file of this patent:

UNITED STATES PATENTS

| Number | Name | Date |
|---|---|---|
| 2,341,699 | Dentler et al. | Feb. 15, 1944 |
| 2,354,826 | Olander | Aug. 1, 1944 |